3,574,132
PROCESS OF ENCAPSULATING BASIC NITROGEN COMPOUNDS WITH ALKALI-PRECURSOR GELATIN
Benjamin Mosier, Houston, Tex., and Charles E. Tippett, Dayton, Ohio, assignors to said Mosier and Microcap, Inc., Houston, Tex.
No Drawing. Continuation-in-part of application Ser. No. 433,501, Feb. 17, 1965. This application Jan. 12, 1968, Ser. No. 697,307
Int. Cl. B01j 13/02; A01n 17/00; C23f 11/14
U.S. Cl. 252—316
13 Claims

ABSTRACT OF THE DISCLOSURE

Process of microencapsulation employing alkali-precursor (Type B) gelatin as the encapsulating macrocolloid, particularly applicable to the formation of liquid center microcapsules containing a basic (cationic) nitrogen compound. For example, an aqueous solution of alkali-precursor gelatin is mixed at an alkaline pH with a water-immiscible organic solvent solution of a nitrogen compound, such as an amine or a quaternary. The pH of the mixture (viz, the gelatin phase) is then reduced to at least 4.5 and preferably 3.8 or below, the liquid phases being intermixed to disperse and emulsify the organic solvent phase in the aqueous phase, thereby providing minute droplets of the basic nitrogen containing organic solvent surrounded by the aqueous solution of the alkali-precursor gelatin. At the low acid pH, the gelatin forms a coating on the droplets and provides encapsulating skins therefor. While the encapsulated droplets can be recovered at the low acid pH, it is preferred to raise the pH to a pH above 5.5 (preferably 7.5–11), and then recover the microcapsules. An auxiliary coating can be applied to the recovered microcapsular material thus produced by contacting the microcapsules with an aqueous solution of acid-precursor gelatin.

CROSS REFERENCES TO RELATED APPLICATIONS

This application is a continuation-in-part of copending application Ser. No. 433,501, filed Feb. 17, 1965, as a continuation-in-part of parent application Ser. No. 316,540, filed Oct. 16, 1963, both now abandoned.

BACKGROUND

Processes for forming microcapsules using macrocolloids as the encapsulating material were known and in commercial use in the United States prior to the present invention. Such processes can be used for encapsulating droplets of a water-immiscible organic solvent containing other substances dissolved or dispersed therein. In general, the technique involves the formation of an emulsion of the organic solvent in an aqueous solution of a single macrocolloid or of two different macrocolloids. While maintaining the oil-in-water type emulsion, the conditions of the aqueous macrocolloid phase are then changed in such a way as to form a copious macrocolloid coacervate. In the coacervate phase, the macrocolloid forms a film around the dispersed droplets, thereby producing the microcapsules.

With respect to the conditions required to form the coacervate phase, there has been a sharp distinction both theoretically and in commercial practice between "simple" coacervation employing a single macrocolloid and "complex" coacervation using two different macrocolloids. The differing conditions and procedures for simple and complex coacervation are described in detail in Kruyt, Colloid Science, vol. 2 (1949).

For simple coacervation, the single colloid can be thrown out of aqueous solution into the coacervate phase by addition of a salt. Microencapsulation by such a simple coacervation process is described in U.S. Pat. No. 2,800,458 (now Re. 24,899). After the capsules are formed, the microcapsular material can be cooled below the gelation temperature of the macrocolloid to set and harden the coating.

For formation of microcapsules by complex coacervation, two different hydrophilic colloid materials having opposite electric charges are employed. After the emulsion has been formed, the conditions are changed to cause complex coacervation to occur. As is well known in the art, the conditions for complex coacervation using different colloids are quite different from those for simple coacervation using a single colloid. For example, the addition of a salt inhibits complex coacervation, while it promotes simple coacervation. Further, complex coacervation is known to be affected by pH change, while simple coacervation is produced by the addition of precipitating agents, such as salts and alcohols.

Microencapsulation by complex coacervation is described in U.S. Pat. No. 2,800,457. According to the process of this patent, the complex coacervation is produced by dilution, that is, adding water to the colloid mixture. In one variation of the procedure, the pH of the mixture is adjusted upwardly so that the complex coacervation will not be brought about by water dilution of the mixture while water is added in an amount which would have caused the complex coacervation had not the pH been adjusted upwardly. Thereafter the pH of the mixture is adjusted downwardly, thereby forming the complex coacervate material, which provides the coating for the dispersed oil droplets.

Although the encapsulation of nitrogen compounds within liquid center microcapsules has been recognized as desirable for use in various applications, prior to the present invention coacervation with macrocolloids has not been successfully applied to the encapsulation of nitrogen compounds such as amines or quaternaries. For example, amines and quaternaries dissolved in oil solvents are extremely difficult, if not impossible, to encapsulate by known processes, such as the simple coacervation process of Green Re. 24,899 or the complex coacervation process of Green et al. 2,800,457. Apparently the presence of the nitrogen compound in the emulsified oil droplets interferes with the formation of microcapsules having liquid-retaining skins.

SUMMARY

This invention is based in part on the discovery that basic nitrogen compounds can be encapsulated by employing a single hydrophilic colloid; namely an alkali-precursor gelatin. Contrary to the teachings of the art, the encapsulation is accomplished by a simple pH change from alkaline to acid without the addition of salt or other colloid precipitating agent. In fact, it is questionable whether the process can be described as involving the formation of a coacervate phase, since the gelatin remains soluble in the aqueous phase at the acid pH of encapsulation. The gelatin does deposit or coalesce around the dispersed droplets of the organic solvent containing the basic nitrogen compound and thus is "coacervated" in the coating layers or "skins" of the droplets, but no continuous coacervate phase is formed, as with prior art processes of simple or complex coacervation. When the process is performed without the presence of the droplets containing the nitrogen compound, substantially no "clouding" of the solution can be observed at the optimum pH's for encapsulation, which are substantially below the isoelectric pH of the alkali-precursor gelatin, and at no time during the pH change process is a copious coacervate phase formed.

The exact mechanism of the microencapsulation process of this invention is still not fully understood, but it appears to involve an electrostatic or coulombic attraction between the alkali-precursor gelatin and the basic nitrogen compound. For example, it has been found that when the nitrogen compound is omitted from the droplets comprise only an organic solvent, such as kerosene, liquid retaining microcapsules cannot be formed, even though all other conditions of the process remain the same.

Studies relating to the encapsulation mechanism of this invention are still far from conclusive, but they indicate that optimum encapsulation occurs when the alkali-precursor gelatin is essentially anionic, that is, when the net charge on the gelatin molecules is such that the gelatin will tend to migrate toward an anode. Further, it has been found that the net charge characteristic of the alkali-precursor gelatin is responsive to and is affected by solution pH.

Alkali-precursor gelatin as commercially produced in the United States normally has an isoelectric pH of about 4.7–5.0. When this so-called "Type B" gelatin is dissolved in water at an alkaline pH, it has been found to have a net positive charge, that is, it can be described as cationic. However, at acid pH's below the isoelectric range, the gelatin acquires a net negative charge and becomes essentially anionic. Once Type B gelatin has been converted from a cationic form to an anionic form by reduction of pH, the anionic form resists reversion to the cationic form even though the pH is again raised above the isoelectric point. In accordance with the process of the present invention, however, the microcapsules are originally formed at a pH below the isoelectric pH of the gelatin, such as a pH of at least 4.5–3.8. In certain preferred embodiments, the encapsulation can be further improved by reducing the pH still further, and/or subsequently raising the pH to at least a pH above the isoelectric range of the gelatin, and preferably to an alkaline pH.

It will be appreciated that basic nitrogen compounds, such as amines or quaternaries, are essentially cationic. Consequently, under conditions where the alkali-precursor gelatin has an anionic character, an electrostatic attraction can occur between the gelatin in the aqueous solution and the nitrogen compound in the dispersed droplets. It will be further apparent that this effect will be maximized where the mixture of the aqueous gelatin and the organic solvent solution of the nitrogen compound is in the form of an essentially oil-in-water emulsion. Fortunately, the desired type of emulsion can be formed and maintained at acid pH's below the isoelectric pH of the gelatin. Prior to the pH's of encapsulation, such as at the isoelectric pH's or above, it is immaterial whether the mixture is a stable or homogeneous emulsion of the oil-in-water type, and it may in fact exist as an essentially water-in-oil emulsion, or as an indeterminate mixture of water-in-oil and oil-in-water emulsions.

These inventive concepts will now be illustrated in terms of preferred embodiments of a process of encapsulating basic nitrogen compounds with alkali-precursor gelatin.

DETAILED SPECIFICATION

The process of this invention is applicable to basic (cationic) organic nitrogen compounds. In general, such compounds contain at least one basic nitrogen atom, and may be aliphatic, cyclic, or cyclo-alphatic, such as aliphatic or cyclic amines and quaternaries. The basic nitrogen may be a primary, secondary, or tertiary amine nitrogen, or the nitrogen atom may be in the form of a quaternary ammonium nitrogen. The basic nitrogen atom may also be in the form of a cyclic nitrogen compound, which may be secondary, tertiary, or quaternary, and more than one basic nitrogen can be present such as with the diamines and diquaternaries. Amine switterions, such as N-substituted trimethylene diamine-N'-alkanoic acids, can also be used. Such amine zwitterions can be employed as corrosion inhibitors in the form of organic acid salts and esters. Hydroxamic acids, such as oleoyl hydroxamic acid, can also be encapsulated by the method of this invention. The nitrogen compounds can contain from 1–30 carbon atoms, but will usually contain from about 4–22 carbons. Where the aliphatic group is obtained from a fatty acid source, the aliphatic group will usually be an alkyl or alkylene group containing from 12–18 carbon atoms. The compounds may contain more than one aliphatic group as well as more than one basic nitrogen atom. The basic nitrogen may be in the form of a free base, or may be in its salt form, such as an organic acid salt, a fatty acid salt, or a naphthenic acid salt.

It will be understood that corrosion inhibition bactericidal, or other desired properties of the nitrogen compounds can vary considerably, and, therefore, in practicing the present invention, a nitrogen compound will be selected which provides the desired properties for the particular application. Typical corrosion inhibition and bactericidal uses of the microcapsular products which can be produced by the process of this invention are described in copending application Ser. No. 451,285, filed Apr. 27, 1965. The aliphatic amines, such as the fatty amines and the fatty diamines, provide a preferred subclass for application as corrosion inhibitors and/or bactericidal agents. Many compounds coming within this subclass provide both corrosion inhibition and bactericidal properties to a considerable extent, and the application involves both corrosion inhibition and bactericidal action. Where it is desired to maximize both properties in a combined application, two or more nitrogen compounds, such as the aliphatic amines, can be employed together.

In the process of this invention, the nitrogen compound is dispersed in an organic solvent which is capable of forming a separate organic solvent phase in admixture with a gelatin-water phase. The nitrogen compound may be dissolved in the organic solvent, or the nitrogen compound can be introduced in the organic solvent as a colloidal suspension. The term "dispersion" is therefore used herein as covering both true solutions and colloidal dispersions. The organic solvent functions as a carrier for the nitrogen compound and permits the nitrogen compound to be effectively encapsulated within a water-soluble coating or "skin."

A wide variety of organic solvents can be used, although the hydrocarbon solvents are particularly satisfactory. In general, the organic solvent should be at least partially immiscible with the gelatin-water phase under the conditions of the process, thereby making it possible to form a dispersed organic solvent phase containing the nitrogen compound. It will be understood that the organic solvent is preferably completely inert with respect to the nitrogen compound. Also the organic solvent is preferably one which does not cause gelatin to deteriorate or denature even on prolonged contact. By way of specific example, kerosene or diesel fuel can be mentioned as particularly desirable solvents. Other similar hydrocarbon solvents, including both aliphatic and aromatic hydrocarbons, can also be used. Chlorinated hydrocarbon solvents are also suitable in certain applications. Partially water miscible solvents, such as n-butanol, can be used by employing as the dispersed phase, the excess organic solvent over that required to saturate the gelatin-water phase. Some organic solvents may be miscible with water, but will become immiscible or only partially miscible when the nitrogen compound is dissolved therein, and thereby can be used. Isopropyl alcohol can be used in this way.

The concentration of the nitrogen compound in the organic solvent can vary over a wide range. However it is generally preferred to employ a relatively high concentration. For example, concentrations of at least 15–35% by weight of the nitrogen compound in the solvent mixture are advantageous. However, lower or higher concentrations can be used, such as concentrations ranging from about 5–50% or higher. The mixture of the organic solvent and the nitrogen compound should be fluid and should be liquid at the temperature used for the encapsulation, which will normally be at an elevated temperature, such as 40° C. or above. Consequently, the organic solvent in some applications may comprise as little as 5–40% of the mixture. By way of specific example, 75 parts by weight of tallow trimethylene diamine dinaphthenate may be dispersed in 25 parts by weight of kerosene to produce a suitable dispersion for encapsulation.

In practicing the method of this invention, an aqueous solution of an alkali-precursor gelatin is employed as the encapsulating medium. Such gelatins are well known to the gelatin industry, and are readily available commercially. Alkali-precursor gelatins are produced by an alkaline extraction of the collagen, and are also known as Type B gelatins. Alternatively, the collagen material can be soaked under alkaline conditions and then extracted at an approximate neutral pH to obtain the alkali-precursor gelatin. The alkali-precursor gelatins are further characterized by having an acidic isoelectric point (viz, Type B, I.E. pH 4.7–5.0). The alkali-precursor gelatin is preferably used as manufactured, and without chemical modification or conversion to derivatives. It is desirable that the gelatin at the concentrations of the process be soluble in water at both alkaline and acid pH's, such as pH's above and below its isoelectric point (viz, pH 6.0–11.0 and pH 4.5–3.0).

The concentration of the aqueous gelatin solution should not be so high at the temperature utilized to the solution to set up or gel. Conversely, the concentration should not be so low that there is not sufficient concentration of gelatin available for the desired encapsulation. Relatively dilute solutions of gelatin are advantageous. For example, the concentration of gelatin solution may run from 0.5–5 or 8% or higher by weight, while a concentration of about 1–5% will usually be satisfactory.

The gelatin solution may be used at any temperature about its gel point and below the temperature at which the gelatin would begin to deteriorate. For example, a temperature within the range from 35–70° C. can be used. Usually, however, the most desirable temperatures may range from about 38–60° C.

In practicing the present invention, a mixture is formed of two liquid phases, one of which is essentially the above-described aqueous solution of alkali-precursor gelatin, and the other is essentially the above-described organic solvent containing the nitrogen compound. Unless the alakali-precursor gelatin has been previously adjusted to an acid pH below its isoelectric point, it will be advantageous to form the two phase liquid mixture at an alkaline pH, and then reduce the pH of the mixture, or more specifically of the gelatin phase, to an acid pH below the isoelectric range of the gelatin. Advantageously, the pH should be reduced to at least 4.5 and preferably to at least 3.8. The phases are intermixed to disperse and emulsify the organic solvent phase in the aqueous phase, thereby providing minute droplets of the basic nitrogen compound containing organic solvent surrounded by the aqueous solution of the alkali-precursor gelatin. Under these conditions, the alkali-precursor gelatin forms a coating on the droplets and provides encapsulating skins therefor. The resulting microcapsular material can then be recovered, or it may be further processed to improve the coating by procedures which will be subsequently described.

In one embodiment of the present invention, the organic solvent dispersion of the nitrogen compound is mixed with the aqueous gelatin solution at an alkaline pH within the range from 7.5–11. Any required pH adjustment can be made with sodium hydroxide or other suitable alkaline reagent, but the natural pH of the mixture will normally be suitable. Advantageously, the initial pH of the mixture, or more specifically of the aqueous solution of gelatin can be within the range from about 8.5–10.5, which can be the pH obtained by simply mixing the ingredients.

The gelatin functions as an emulsifying agent, but standard emulsifying agents can be employed, such as ethoxylated nonyl phenol or an ethoxyoctyl phenol, to promote the formation of the desired oil-in-water type of emulsion. Desirable emulsifying agents of this type usually have been prepared by condensation of from 15 to 60 mols of ethylene oxide with each mol of the actyl or nonyl phenol. Other emulsifying agents of the oil-in-water type can also be used.

Other ingredients may also be incorporated in the mixture from which the capsular material is to be formed, such as a substantially water-insoluble metal compound in the form of a fine powder. For example, a salt, oxide, or hydroxide of a polyvalent metal may be included. Powdered lead oxide is particularly desirable, and powdered barium sulfate can also be advantageously employed. The incorporation of such metal compound to produce weighted microcapsules is described in copending application, Ser. No. 451,285, filed Apr. 27, 1965. While the incorporation of such weighting agents is not essential for carrying out the encapsulating method of the present invention, the use of a powdered polyvalent metal compound provides certain process advantages. For example, it can promote emulsion formation and/or stability, that is, the fine powder functions as an auxiliary emulsifying agent. For this purpose, the aqueous gelatin phase can contain from 10 to 150 (or preferably 20 to 120) parts by weight of the metal compound per each 100 parts of the aqueous gelatin.

The initial mixture at the alkaline pH may tend to be non-homogeneous, containing both oil-in-water and water-in-oil emulsions in varying proportions. However, this is not detrimental to the process of this invention. As the next step in the process, the mixture is subjected to a pH change from alkaline to acidic. For example, the pH of the mixture can be reduced gradually while continually agitating or stirring the mixture by the addition of a suitable acidic reagent, such as an inorganic acid like hydrochloric acid. This pH adjustment to the acid side is preferably continued until a substantially stable, relatively homogeneous oil-in-water emulsion is present at a pH not over 4.5 and preferably 3.8 or lower. The mixture can be observed by eye during the pH adjustment to determine its conditions, or samples may be periodically subjected to microscopic examination. The presence of a substantially continuous water phase with a dispersed oil phase may also be detected by electrical resistivity measurements. Even when part of the oil phase is undispersed, the dispersed portions will form the desired capsules. Since, the pH adjustment from alkaline to acidic involves passing through the isoelectric range of the alkali-precursor gelatin, a partial phase inversion may occur with an increase in the proportion of water-in-oil emulsion to oil-in-water emulsion. However, continued reduction of the pH will give the desired stable, homogeneous oil-in-water emulsion, at pH's of 4.5 down to 2.0. Under most conditions of operation, the most desirable pH range will be from about 3.8 down to about 3.0. After the completion of the pH reduction, the solution will contain the microcapsular material comprising minute droplets of the water-immiscible solvent having the nitrogen compound dispersed therein, and the droplets being enclosed in an outer skin of gelatin. If desired, the microcapsular material may be separated and recovered at this point by any suitable procedure, such as centrifugation or filtration, thereby partially or completely separating the microcapsular material from the supernatant solution.

However, it will usually be desirable to subject the microcapsule-containing mixture to another pH adjustment before separation or recovery of the microcapsular material. More specifically, the pH of the supernatant solution containing the microcapsular material may be readjusted with an alkaline reagent to a pH above the isoelectric pH of the gelatin. For example, the pH may be readjusted to a pH of above 5.5. Preferably, the final pH is within the range from 7.5 to 11.0. The pH readjustment tends to further promote the formation of the microcapsular material, or, more particularly, the growth and strengthening of the gelatin skins around the liquid droplets. Resistivity measurements indicate that the oil-in-water character of the emulsion also can be further improved by the pH readjustment. Here again, the theory or mechanism involved is not understood. However, the effect of the pH readjustment can be observed by microscopic examination of samples of the material before, during and after the pH readjustment.

Following the pH adjustments, the microcapsular material can be conveniently recovered or concentrated by a salting-out procedure employing a salt such as sodium sulfate, ammonium sulfate, magnesium chloride, aluminum chloride, aluminum sulfate, and the like. Alternatively, the microcapsular material can be recovered or concentrated by centrifugation. Where a salt solution is added, such as a sodium sulfate solution, the microcapsular material will tend to settle to the bottom and the supernatant can then be removed by decanting. The remaining material, comprising a concentrated slurry of the microcapsular material, can then be shipped or used in this form. In fact, this has been found to be a very convenient form for storage and handling. In the recovery operation, the temperature of the material will ordinarily be reduced below the gelatin temperature of the gelation (viz, to room temperature, 20-25° C.), thereby setting and hardening the gelatin coating.

If desired, the microcapsular material can be subjected to an auxiliary coating procedure to produce thicker gelatin skins, thereby making the capsular material more-slowly solubilized. For example, the capsules can be separated from the remaining supernatant solution by centrifugation or filtration, and then introduced into an aqueous gelatin solution. Since the gelatin used for the original encapsulation was alkali-precursor gelatin (Gelatin B), the gelatin solution used for the auxiliary coating procedure should be an acid-precursor gelatin (Gelatin A). For example, the second gelatin solution may contain the acid-precursor gelatin in a concentration of from 0.5 to 5% by weight, preferably about 1-3% by weight. The solution can be kept at a temperature of about 40-55° C. If desired, a pH adjustment may be used with the auxiliary coating step, although this is not required. At its natural pH and at the temperature specified, the gelatin of different isoelectric pH will tend to form a second skin or coating around the microcapsular material. If desired, this coating may be further promoted by reduction in temperature of the coating solution, although this is not normally required.

The method of this invention is further illustrated by the following specific examples:

EXAMPLE 1

The encapsulation may conveniently be carried out in an open container so that a visual observation can be made at all times. The reactor should be equipped with a stirrer, capable of creating an oil-in-water emulsion. This stirring is continued throughout the entire operation, which can utilize the formulations and procedure specified below:

Formulation

| | Lbs. |
|---|---|
| Gelatin B (alkali-precursor gelatin) in 123.6 lbs. of water | 3.3 |
| Lead oxide powder | 61.8 |
| Tallow trimethylene diamine dinapthenate (Duomeen TDS-75) in 25% kerosene | 6.6 |
| Kerosene | 6.6 |
| Igepal CO-887 (70% aqueous solution ethoxylated nonyl phenol having 30 mols ethylene oxide per mol nonyl phenol) | 22.2 |

Preparation of mixture

The mixing order is:

(1) The 3.3 lbs. of Gelatin B is dissolved in the water at 50° C.
(2) The 61.8 lbs. of lead oxide is dispersed in the gelatin solution.
(3) The 82.5 lbs. of kerosene-Duomeen TDS-75 mixture and 6.6 lbs. of added kerosene are thoroughly mixed at 50° C., then added to the mixture of 1 and 2, viz, the gelatin-$H_2O$-PbO mixture).
(4) The 22.2 lbs. of Igepal CO-887 is added to the above mixture.

Encapsulation

The initial pH (about 10) of the mixture is adjusted to 3.8 with 18% HCl. This should take about 30 liters of the 18% HCl, which is added slowly over about 6 to 8 hours. At this point the mixture should be an oil-in-water emulsion.

The pH is adjusted from 3.8 to 8.5 with a 35% solution of NaOH. This should take about 6 liters of the 35% NaOH solution, which is added slowly over about 4 to 5 hours.

The temperature during this operation is about 50° C.

Separation

The encapsulated product is stirred into 50 gallons of a 20% $Na_2SO_4$ solution. The stirring is continued for 30 minutes. This operation is done with the $Na_2SO_4$ solution at room temperature. After the $Na_2SO_4$ solution has been filtered off, the material is stirred into 14.85 gallons of $H_2O$ into which has been dissolved 4.13 lbs. of acid-precursor gelatin (Gelatin A, 175-bloom) at 50° C. The stirring is continued until there is a homogeneous mixture. The mixture then is stirred into 50 gallons of a 25% $Na_2SO_4$ solution. The stirring is continued for 30 minutes. This operation is done with the $Na_2SO_4$ solution at room temperature. After the 30 minute stirring period, the stirring is stopped and the material is allowed to settle out. After the material has settled, the excess $Na_2SO_4$ solution is drawn off. The material remaining is the encapsulated product.

EXAMPLE 2

Three grams of alkali-precursor gelatin (Gelatin B, 225-bloom) were dissolved in 150 milliliters of water. 75 gms. of PbO powder were added to the gelatin solution. To the gelatin-PbO mixture was added a mixture of 68.0 grams of coco trimethylene diamine, 12.75 grams of tallow trimethylene diamine dinaphthenate (75% active, 25% kerosene), and 4.25 grams of kerosene.

The pH of the mixture was slowly adjusted with continued stirring from the initial pH of 9.8 to pH 4.5 with 18% hydrochloric acid. 5 milliliters of formaldehyde solution (37%) was added to harden the microcapsular material and the pH adjusted to 9.8 with 35% NaOH before recovery of the encapsulated material. All of the above operations were carried out at 40° C.

The microcapsular material was separated out in a solution made up of 1.5% potassium ferrocyanide and 1.0% ammonium sulfate. Stirring time was 2 minutes.

EXAMPLE 3

Six grams of alkali-precursor gelatin (Gelatin B, 225-bloom) were dissolved in 150 milliliters of water and 75 grams of lead oxide were stirred into the solution. 85 grams of a solution made up of 70% dicoco dimethyl quaternary ammonium chloride, 20% tallow trimethylene diamine dinapthenate, and 10% kerosene were added. During the mixing period 25 milliliters of Igepal CO–887 (ethoxylated nonyl phenol) were added. The temperature of the mixture was maintained at 40° C. during the following pH changes. The pH of the mixture was slowly adjusted with continuous stirring from the initial pH of 9.5 to pH 3.8 with 18% hydrochloric acid. The pH was then adjusted from 3.8 to 9.3 with 35% active sodium hydroxide. The encapsulation was very good.

The material was separated out by stirring into a 20% solution of sodium sulfate. After a 5-minute stirring period, the material was allowed to settle and the excess sodium sulfate solution was poured off. The remaining material was poured into 150 milliliters of water in which 8 grams of acid-precursor gelatin (Gelatin A, 175-bloom) had been dissolved.

The material was again separated out in a 20% solution of sodium sulfate. As the material was being stirred in the sodium sulfate solution, the pH of the solution was adjusted to 9.8 with 35% active sodium hydroxide. This pH change of the sodium sulfate solution caused the material to break into more distinct particles and settle from the sodium sulfate faster and more completely.

EXAMPLE 4

Four grams of alkali-precursor gelatin (Gelatin B, 225-bloom) were dissolved in 150 milliliters of water and 75 grams of lead oxide stirred into the gelatin solution. 85 grams of a solution made up of 70% oleoyl hydroxamic acid, 20% tallow trimethylene diamine dinapthenate, and 10% kerosene were thoroughly mixed with the gelatin solution-lead oxide combination. During this mixing period, 25 ml. of Igepal CO–887 (ethoxylated phenol) were added. The temperature of this mixture was maintained at 40° C. during the following pH changes, and stirring was continued. The pH of the mixture was adjusted from the initial pH of 9.3 to 3.8 with 18% hydrochloric acid. At this point a stable oil-in-water emulsion was obtained. The pH was then adjusted from 3.8 to 8.2 with 35% active sodium hydroxide. The encapsulation was very good.

The material was separated out by stirring it in a 20% solution of sodium sulfate. The stirring was continued for 10 minutes, during which time the pH of the sodium sulfate solution was adjusted to 9.5. The solids were filtered out by suction filtration.

The solid material was dispersed into 150 ml. of water in which 6 grams of acid-precursor gelatin (Gelatin A, 175-bloom) had been dissolved. The material was again separated out in a 20% solution of sodium sulfate and the pH of the solution adjusted to 9.5. The stirring time was 10 minutes.

EXAMPLE 5

Five grams of alkali-precursor gelatin (Gelatin B) were dissolved in 150 ml. of water and 75 grams of lead oxide were stirred into the gelatin solution. Thereafter, 85 grams of coco-trimethylene diamine (75% active, 25% isopropyl alcohol), and 5 grams of Igepal CO–887 (ethoxylated nonyl phenol) were added and thoroughly mixed. With continual stirring, the pH was adjusted to 4.0 with 27% hydrochloric acid. Thereafter the pH was adjusted with 35% sodium hydroxide to a pH within the range from 9 to 10. At this point, the encapsulation was complete. The slurry was dispersed into 20% aqueous sodium sulfate for separation of the encapsulated material.

EXAMPLE 6

Six grams of alkali-precursor gelatin (Gelatin B) were dissolved in 150 ml. of water, and 75 grams of lead oxide powder were stirred into the gelatin solution. Thereafter 100 grams of Arquad T–2C were added. Arquad T–2C consists of a mixture of tallow trimethyl quaternary ammonium chloride and dicoco dimethyl quaternary ammonium chloride, 50% active in isopropyl alcohol. Thereafter, with continual stirring, the pH was adjusted with 27% hydrochloric acid to approximately pH 3. Next the pH was readjusted with 30% sodium hydroxide to a pH in the range of 9 to 10. The encapsulation was then complete. The encapsulated material was separated, as previously described, with 20% sodium sulfate.

EXAMPLE 7

Five grams of alkali-precursor gelatin (Gelatin B) were dissolved in 150 ml. of water, and 75 grams of powdered lead oxide were stirred into the gelatin solution. Then 85 grams of Arquad-S was added. Arquad-S is soya trimethyl quaternary ammonium chloride, 50% active in isopropyl alcohol. Twenty grams of Igepal CO–887 (ethoxylated nonyl phenol) were also added. With continual stirring, the pH was gradually adjusted to approximately 4 by the addition of 27% hydrochloric acid. Following this adjustment, the pH was readjusted with sodium hydroxide to approximately 9 to 10. At this point, the encapsulation was complete, and the encapsulated material was separated, as previously described, by using 20% sodium sulfate.

EXAMPLE 8

Six grams of alkali-precursor gelatin (Gelatin B) were dissolved in 150 ml. of water at 50° C. Then 100 grams of Duomeen TDS containing 10 ml. of kerosene was added. Duomeen TDS is the diamine identified in Example 1. Forty grams Igepal CO–887 (ethoxylated nonyl phenol) were also added with vigorous agitation. With continued stirring, the pH was gradually adjusted to approximately 3.5 with 19% hydrochloric acid. Following this adjustment, the pH was readjusted with 35% sodium hydroxide to approximately 8 to 9. At this point, the encapsulation was complete and the encapsulated material was separated as previously described, using 20% sodium sulfate. No powdered metal compound was employed.

EXAMPLE 9

Six grams of alkali-precursor gelatin (Gelatin B) were dissolved in 150 ml. of water at 50° C. The gelatin solution was acidified to a pH of approximately 3.5 with 19% hydrochloric acid. Then 100 grams of the same diamine as Example 8 containing 10 ml. of kerosene was added with vigorous agitation followed by the addition of 40 grams of Igepal CO–887 (identified in Example 8). With continuing agitation the pH was then readjusted to a pH of approximately 3.5 with 19% hydrochloric acid. The pH was then raised with 35% sodium hydroxide until a pH of approximately 8 to 9 had been achieved. At this point, the encapsulation was complete, and the encapsulated material was recovered in the 20% sodium sulfate solution previously described. No powdered metal compound was used.

EXAMPLE 10

As a variation of the procedure of Example 9, microcapsules can be produced by gradually adding with agitation the diamine (or other cationic nitrogen compound) and sufficient HCl to maintain the preacidified Gelatin B at a pH below 4.5. The addition of the HCl is continued to a final low acid pH of about 3.0–3.5. The pH is then raised as described in Example 9 to a final basic pH of 8 to 9, and the microcapsular material is recovered.

As illustrated by Examples 8–10, the presence of a powdered metal compound is not essential for forming the microcapsules by the process of this invention. These examples further illustrate that the alkali-precursor gelatin can be pre-acidified to a pH below its isoelectric point, thereby making it anionic for attraction to the cationic nitrogen compound in the organic solvent droplets. Since the pre-acidified alkali-precursor gelatin tends to maintain its anionic charge, the pH can be briefly raised above its isoelectric pH, or even to an alkaline pH, during the mixing of the gelatin phase with the organic solvent phase, which is strongly basic because of the nitrogen compound. The pH can then be readjusted to a pH below 4.5 or preferably to an acid pH of not over 3.8, as previously described. Alternatively, the organic solvent phase can be gradually added to the pre-acidified gelatin phase while adding sufficient acid to maintain the pre-acidified Gelatin B at a pH below 4.5, or below 3.8. As previously described, the addition of the acid should be continued to a pH of not over 3.8, and advantageously a pH in the range of 3.0–3.5. Thereafter, although the microcapsules can be recovered at the low acid pH, it is preferred to again raise the pH, as previously described, such as to a pH in the range of 7.5 to 11, and then recover the microcapsules.

While in the foregoing specification this invention has been described in relation to specific embodiments thereof, and many details have been set forth for the purpose of illustration, it will be apparent that the invention is not limited to the specific examples set forth and that many of the details may be varied considerably without departing from the basic concepts and principles of the invention.

We claim:

1. A process of microencapsulation by simple coacervation comprising:
   (a) forming a mixture of two liquid phases one of which is essentially an aqueous solution of a single macrocolloid and the other is essentially an at least partially water-immiscible organic solvent having an organic basic nitrogen compound selected from the class consisting of amines and quaternaries dispersed therein,
      said macrocolloid being an alkali-precursor gelatin soluble in water at both alkaline and acid pH's and said aqueous gelatin phase being initially at an alkaline pH;
   (b) reducing the pH of said aqueous gelatin phase to an acid pH of at least 4.5 and intermixing said phases to disperse and emulsify said organic solvent phase in said aqueous phase, thereby providing minute droplets of said organic solvent containing basic nitrogen compound surrounded by said aqueous solution of said alkali-precursor gelatin,
      said alkali-precursor gelatin forming a coating on said droplets and providing encapsulating skins therefor; and
   (c) recovering the encapsulated droplets thus produced.

2. The process of claim 1 wherein said alkali-precursor gelatin is further characterized by an isoelectric pH of 4.7–5.0 and the pH of said aqueous gelatin phase in admixture with said organic solvent phase is reduced to at least 3.8.

3. The process of claim 1 wherein said nitrogen compound is dissolved in said organic solvent in a concentration of from 5–50% by weight.

4. The process of claim 1 wherein said gelatin phase is initially at a pH of from 8.5–10.5 and a concentration of from about 0.5–5% gelatin by weight.

5. A process of microencapsulation by simple coacervation comprising:
   (a) forming a mixture of two liquid phases one of which is essentially an aqueous solution of a single macrocolloid and the other is essentially an at least partially water-immiscible organic solvent having an organic basic nitrogen compound dispersed therein,
      said macrocolloid being an alkali-precursor gelatin soluble in water at both alkaline and acid pH's and having an isoelectric pH of 4.7–5.0 and said nitrogen compound being selected from the class consisting of amines and quaternaries,
      said mixture and said aqueous gelatin phase being initially at a pH of from 8.5–10.5;
   (b) reducing the pH of said mixture and said aqueous gelatin phase to an acid pH of at least 3.8 and intermixing said phases to disperse and emulsify said organic solvent phase in said aqueous phase, thereby providing minute droplets of said organic solvent containing basic nitrogen compound surrounded by said aqueous solution of said alkali-precursor gelatin,
      said alkali-precursor gelatin forming a coating on said droplets and providing encapsulating skins therefor; and
   (c) recovering the encapsulated droplets thus produced.

6. The process of claim 5 wherein after said pH reduction but before recovering said gelatin encapsulated droplets the pH of said mixture is raised to a pH above 5.5.

7. The process of claim 5 wherein said mixture as originally formed contains a substantially water-insoluble inorganic salt of a polyvalent metal compound in the form of a fine powder.

8. The process of claim 5 wherein said alkali-precursor gelatin encapsulated droplets are further processed by being contacted with an aqueous solution of acid-precursor gelatin, thereby forming an auxiliary coating of said acid-precursor gelatin on the alkali-precursor gelatin skins of said droplets.

9. A process of microencapsulation by simple coacervation comprising:
   (a) forming a mixture of two liquid phases one of which is essentially an aqueous solution of a single macrocolloid and the other is essentially an at least partially water-immiscible organic solvent having an organic basic nitrogen compound dispersed therein,
      said macrocolloid being an alkali-precursor gelatin soluble in water at both alkaline and acid pH's and having an isoelectric pH of 4,7–5.0 and being present in said aqueous phase in a concentration of from 0.5–5% gelatin by weight,
      said nitrogen compound being selected from the class consisting of amines and quaternaries and being dissolved in said organic solvent in a concentration of from 5–50% by weight,
      said mixture and said gelatin phase being initially at a pH of from 8.5–10.5;
   (b) reducing the pH of said mixture and said gelatin phase to an acid pH of at least 3.8 and intermixing said phases to disperse and emulsify said organic solvent phase in said aqueous phase, thereby providing minute droplets of said organic solvent containing basic nitrogen compound surrounded by said aqueous solution of said alkali-precursor gelatin,
      said alkali-precursor gelatin forming a coating on said droplets and providing encapsulating skins therefor;
   (c) raising the pH of said mixture and said gelatin phase to a pH of from 7.5–11;
   (d) recovering the encapsulated droplets thus produced; and
   (e) contacting said encapsulated droplets with an aqueous solution of acid-precursor gelatin having a concentration of 0.5–5% gelatin by weight.

10. The process of claim 9 wherein said mixture as oriignally formed contains a substantially water-insoluble inorganic salt of a polyvalent metal compound in the form of a fine powder dispersed in said aqueous gelatin phase in an amount of from 20 to 120 parts by weight of said metal compound per each 100 parts of said aqueous gelatin phase.

11. A process of microencapsulation by simple coacervation characterized by forming a mixture of two liquid phases one of which is essentially an aqueous solution of a single macrocolloid and the other is essentially a substantially water-immiscible organic solvent having an organic basic nitrogen compound selected from the class consisting of amines and quaternaries dispersed therein, said macrocolloid being an alkali-precursor gelatin soluble in water at both alkaline and acid pH's, said gelatin phase and said organic solvent phase being mixed together at an acid pH of less than 3.8, said organic solvent phase being dispersed and emulsified in said aqueous phase to provide minute droplets of said organic solvent containing basic nitrogen compound surrounded by said aqueous solution of said alkali-precursor gelatin at said pH of less than 3.8, said alkali-precursor gelatin thereby forming a coating on said droplets and providing encapsulating skins therefor, and thereafter recovering the encapsulated droplets thus produced.

12. The process of claim 11 in which the pH of said mixture is raised from said acid pH of not over 3.8 to a pH of from 7.5–11 before said encapsulated droplets are recovered.

13. The process of claim 1 wherein said amines and quaternaries contain about 4 to 22 carbon atoms.

References Cited
UNITED STATES PATENTS

| | | | |
|---|---|---|---|
| 2,460,259 | 1/1949 | Kahler | 252—8.55(E)X |
| 2,800,457 | 7/1957 | Green et al. | 252—316 |
| 2,833,712 | 5/1958 | Jones | 252—8.55(E) |
| 2,914,557 | 11/1959 | Oxford, Jr. | 252—392X |
| 3,028,308 | 4/1962 | Zambito et al. | 252—316X |
| 3,069,370 | 12/1962 | Jensen et al. | 252—316X |
| 3,270,100 | 8/1966 | Jolkovski et al. | 252—316X |

RICHARD D. LOVERING, Primary Examiner

U.S. Cl. X.R.

117—100; 252—8.55, 390, 392; 264—4; 424—37